US011075039B2

(12) United States Patent
Gentsch

(10) Patent No.: US 11,075,039 B2
(45) Date of Patent: Jul. 27, 2021

(54) POLE PART FOR MEDIUM VOLTAGE SWITCHGEAR

(71) Applicant: ABB Schweiz AG, Baden (CH)

(72) Inventor: Dietmar Gentsch, Ratingen (DE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/393,978

(22) Filed: Apr. 25, 2019

(65) Prior Publication Data
US 2019/0252141 A1 Aug. 15, 2019

Related U.S. Application Data
(63) Continuation of application No. PCT/EP2017/077070, filed on Oct. 24, 2017.

(30) Foreign Application Priority Data
Oct. 25, 2016 (EP) .................................... 16195478

(51) Int. Cl.
H01H 33/662 (2006.01)
H02B 13/035 (2006.01)

(52) U.S. Cl.
CPC ... *H01H 33/66207* (2013.01); *H02B 13/0354* (2013.01); *H01H 2033/6623* (2013.01)

(58) Field of Classification Search
CPC ............. H01H 33/66; H01H 33/66207; H01H 2033/6623; H02B 13/0352; H02B 13/0354
See application file for complete search history.

(56) References Cited

U.S. PATENT DOCUMENTS

| 3,626,123 | A | * | 12/1971 | Pflanz | H01H 33/66207 218/134 |
| 6,130,594 | A | | 10/2000 | Morant et al. | |
| 6,172,317 | B1 | * | 1/2001 | Wristen | H01H 33/6606 218/135 |
| 2002/0171531 | A1 | | 11/2002 | Meckler et al. | |
| 2012/0292163 | A1 | * | 11/2012 | Reuber | H01H 33/66207 200/293 |
| 2013/0126479 | A1 | * | 5/2013 | Shang | H01H 33/66207 218/120 |
| 2013/0126480 | A1 | * | 5/2013 | Shang | H01H 33/66207 218/134 |

(Continued)

FOREIGN PATENT DOCUMENTS

| CN | 104576172 A | 4/2015 |
| CN | 104658811 A | 5/2015 |

(Continued)

OTHER PUBLICATIONS

Erk DE102007007695 EPO machine translation (Year: 2008).*

Primary Examiner — Jacob R Crum
(74) Attorney, Agent, or Firm — Leydig, Voit & Mayer, Ltd.

(57) ABSTRACT

A pole part for medium voltage switchgear includes: a vacuum interrupter embedded in an insulating housing including at least one of epoxy, a bulk moulded component, or a thermoplastic or plastic material, a bottom part of the insulating housing including a mechanical fixation device for fixing the pole part on a support element. The bottom part of the pole part includes a casted on or moulded on axial externally or internally threaded section that includes an insulating material.

12 Claims, 1 Drawing Sheet

(56) References Cited

U.S. PATENT DOCUMENTS

2014/0175058 A1\* 6/2014 Gentsch ............... H01H 1/5822
218/124

FOREIGN PATENT DOCUMENTS

| DE | 102007007695 A1 | 8/2008 |
|---|---|---|
| EP | 2312606 A1 | 4/2011 |
| EP | 2418670 A1 | 2/2012 |

\* cited by examiner

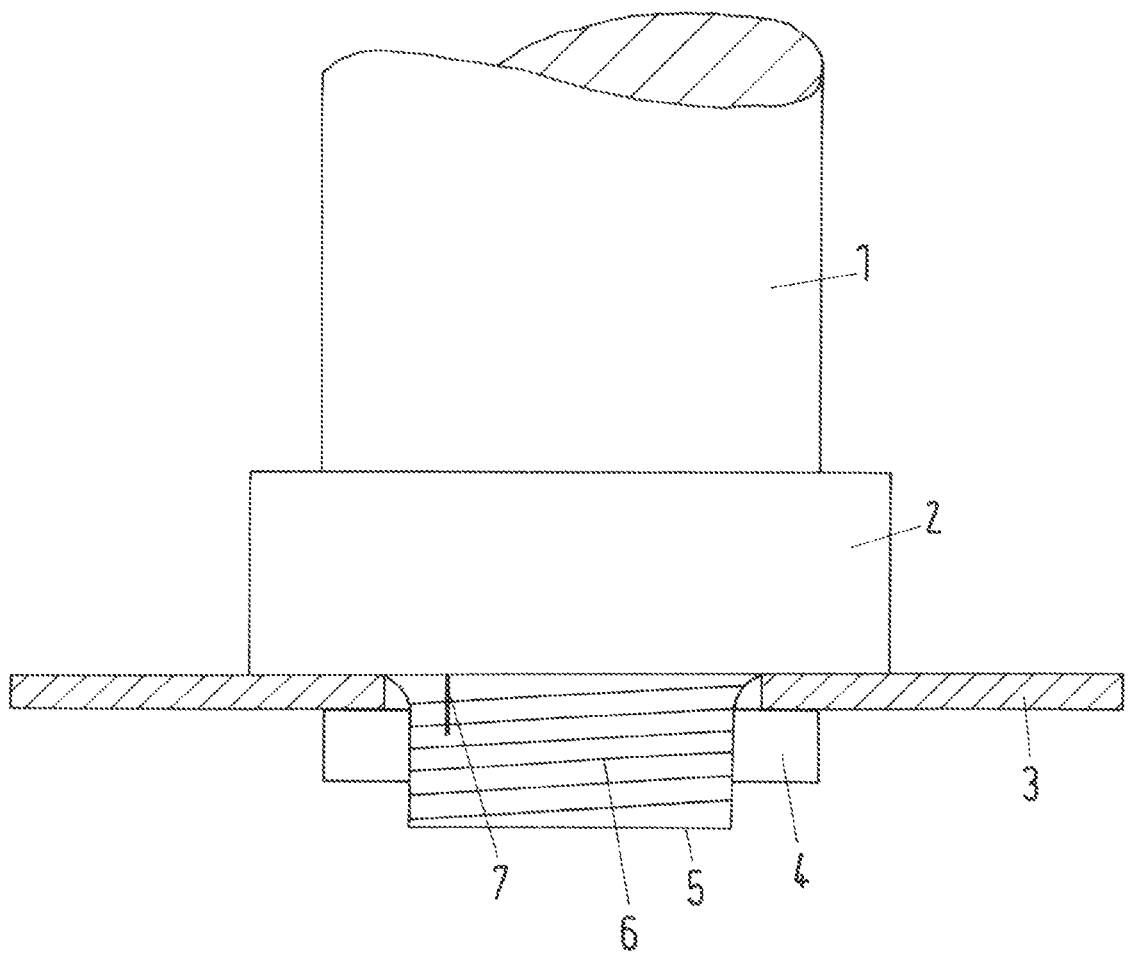

POLE PART FOR MEDIUM VOLTAGE SWITCHGEAR

CROSS-REFERENCE TO PRIOR APPLICATION

This application is a continuation of International Patent Application No. PCT/EP2017/077070, filed on Oct. 24, 2017, which claims priority to European Patent Application No. EP 16195478.9, filed on Oct. 25, 2016. The entire disclosure of both applications is hereby incorporated by reference herein.

FIELD

The invention relates to a pole part for medium voltage switchgear, with a vacuum interrupter embedded in an insulating housing made of plastic material, epoxy, bulk moulded component (bmc), or thermoplastic material, with a bottom part, provided with a mechanical fixation device, in order to fix the pole part on a support element, and a switchgear with the use of such a pole part, and a method for manufacturing the same.

BACKGROUND

To fix the pole parts within a switchgear or at the breaker, the today's solution is to use some screws, which can be inserted into the pole part at three, four or even more fixation points. For such well known fixation, the female threads are implemented or integrated into the bulk of the housing. These integrated female threads correspond with the screws, which will be screwed into these integrated female threads. This can cause damage in that area, so far it is a core area of the insulating housing.

SUMMARY

In an embodiment, the present invention provides a pole part for medium voltage switchgear, comprising: a vacuum interrupter embedded in an insulating housing comprising at least one of epoxy, a bulk moulded component, or a thermoplastic or plastic material, a bottom part of the insulating housing comprising a mechanical fixation device configured to fix the pole part on a support element, wherein the bottom part of the pole part comprises a casted on or moulded on axial externally or internally threaded section comprising an insulating material.

BRIEF DESCRIPTION OF THE DRAWINGS

The present invention will be described in even greater detail below based on the exemplary FIGURES. The invention is not limited to the exemplary embodiments. Other features and advantages of various embodiments of the present invention will become apparent by reading the following detailed description with reference to the attached drawings which illustrate the following:

FIG. 1 shows schematically the bottom section a pole part 1, of a medium voltage switchgear, with an embedded vacuum interrupter, which is not visable as such.

DETAILED DESCRIPTION

In an embodiment, an object of the invention is to reduce mechanical stress and the risk of a break of the insulating housing.

In order to overcome the aforesaid problem, the basical invention related idea is, that the bottom part of the pole part is provided with a casted on, or moulded on axial externally or internally threaded section, made of insulating material.

The main advantage is, that the connection to a fix part at the housing will be done by applying a screw nut in case of an external thread, or a screw in case of an inner thread.

This can be done in one step during the manufacturing process and leads to a distribution of mechanical stress more uniform in both parts the housing and the pole part.

Concerning to the method for manufacture such pole part, the threaded area will be made directly during the manufacturing of the pole part at the outside/inside of the pole part by injection moulding or other plastic housing manufacturing, with the same insulating material.

A further advantage is, that there are no dowels needed and the thread can be formed during the standard process.

In a further advantageous embodiment, the bottom part of the pole part is provided with a casted on, or moulded on axial externally or internally threaded section.

A further advantageous embodiment is, that the casted on, or moulded on axial externally or internally threaded section is formed as an one piece extension of the pole part housing. This results in a homogeneous distribution of mechanical force.

Furthermore advantageous is, that the axial externally or internally threaded section is formed as an extended appendix at the bottom of the pole part housing. Mechanical stress introduction into the insulating housing is reduced.

In a further advantageous embodiment, the appendix can be formed as solid cylindrical section, or as hollow tubelike section.

In a further advantageous embodiment, at least in the transition area between the bottom of the pole part housing and the axial externally threaded section, are implemented fibres or structures for mechanical reinforcement of that area.

A further advantageous embodiment is, that at least in the transition area between the bottom of the pole part housing and the axial externally threaded section, are implemented fibres or structures into the bulk material, for mechanical reinforcement of that area.

In a further advantageous embodiment, the implemented structures are axially extended moulded conductive elements, which additionally to their implementation of reinforcement, are integrated as electrodes for capacitive shielding.

According to a medium voltage switchgear by the use of pole part embodiments, mentioned above, it is advantageous, that a three phase arrangement of pole parts is mounted on a support or base plate with openings, to mount the pole parts, wherein the aforesaid axial externally or internally threaded sections of the pole parts, which are each secured by a female screw or a screw nut at the opposite side of the support or base plate.

According to a method for manufacturing of a pole part for medium voltage switchgear, with a vacuum interrupter embedded in an insulating housing made of epoxy, bulk moulded component—, or thermoplastic material, with a bottom part, provided with a mechanical fixation device, in order to fix the pole part on a support element, the invention is, that the threaded area will be attached directly during the manufacturing of the pole part at the outside/inside of the pole part by injection moulding or other plastic housing manufacturing.

Importantly, the aforesaid invention related threaded area is not attached separately but implemented in a one piece injection moulding as added, but integral structure.

In a further advantageous embodiment, the fibre or ceramic elements are implemented into the moulded material as mechanical reinforcement, at least in the structural transition area between the pole part bottom part and the threaded area.

In case of an externally threaded part, the insulating housing is mechanically balanced in such, that the risk of mechanical stress to the housing is reduced.

In a further advantageous embodiment, at least one conductive electrode or shielding is integrated into the bulk material of the threaded area.

By that, unallowed capacitive coupling could be reduced or prevented.

A last advantageous embodiment is, that at least the pole will be sealed at the side, where the part will be included in a switchgear opening.

The embedding insulating material for the embedding housing can be epoxy or bulk moulded component- or thermoplastic material.

At the bottom part 2 of the pole part 1, is arranged a kind of a cylindric appendix 5, which is provided with an external thread 6.

So the pole part 1 can be positioned with that appendix 5 in a hole of a base plate or support frame 3. Then the pole part 1 can be fixed finally with a female screw nut 4, which corresponds to the external thread 6 of the aforesaid appendix 5. At the step, there could be applied a sealing to the pole and the part with some openings, to provide an opportunity, to go from one compartment to another, one with sealing in between each other.

At least the transition area between the bottom part 2 of the pole part 1 and the appendix 5 can be provided with fibres or ceramic elements, in order to reinforce that region mechanically. These fibres or the ceramic elements, are implemented into the injection moulded bulk material.

The aforesaid appendix can be realized by a solid cylindrical extension of the insulating housing of the pole part, or by a hollow tubelike extension, provided with an external male thread, or a internal female thread.

In case of an external thread, a screw nut is used, to fix the pole part on a base plate or compartment housing.

In case of an internal thread female thread, the pole part can be fixed by a screw.

A further embodiment can be, that in the aforesaid cylindric or tubelike appendix 5 an electrode 7 is implemented. Especially when this electrode 7 is a conductive cylindric tube, implemented integrally in the bulk material of the appendix 5, it can fulfill a double function. Firstly the mechanical reinforcement and secondly a dielectric decoupling or shielding in that area. For that, this electrode is conductively connected to the support frame.

The implemented thread also result effectively in a creepage path enlargement.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 pole part
2 bottom part of the pole part
3 switchgear compartment, or support plate
4 screw nut
5 extension of the pole part, appendix
6 male external thread
7 electrode

What is claimed is:

1. A pole part for medium voltage switchgear, comprising:
a vacuum interrupter embedded in an insulating housing comprising at least one of epoxy, a bulk moulded component, or a thermoplastic or plastic material, a bottom part of the insulating housing comprising a mechanical fixation device configured to fix the pole part on a support element,
wherein the bottom part of the pole part comprises a casted on or moulded on axial externally threaded section comprising an insulating material.

2. The pole part according to claim 1, wherein the threaded section comprises a one piece extension of the pole part housing.

3. The pole part according to claim 1, wherein the threaded section comprises an extended appendix at the bottom part of the pole part housing.

4. The pole part according to claim 3, wherein the appendix comprises a solid cylindrical section or a hollow tubelike section.

5. The pole part according to claim 1, further comprising fibres or structure implemented into a bulk material at least in a transition area between the bottom part of the pole part housing and the threaded section so as to provide mechanical reinforcement of the transition area.

6. The pole part according to claim 5, further comprising fibres or structures implemented at least in the transition area between the bottom part of the pole part housing and the threaded section so as to provide mechanical reinforcement of the transition area.

7. The pole part, according to claim 6, wherein the fibres or structures comprise axially extended conductive elements comprising electrodes configured to provide capacitive shielding.

8. A medium voltage switchgear, comprising:
pole parts according to claim 1, wherein in a three phase arrangement of pole parts, the arrangement is mounted on a support or base plate with openings to mount the pole parts, and wherein threaded sections of the pole parts are each secured by a screw nut at an opposite side of the support or base plate.

9. A method for manufacturing a pole part for medium voltage switchgear, comprising:

providing a vacuum interrupter embedded in an insulating housing comprising at least one of epoxy, a bulk moulded component, or a thermoplastic or other plastic material, a bottom part of the insulating housing comprising a mechanical fixation device configured to fix the pole part on a support element; and casting on or moulding on, by injection moulding or other plastic housing manufacturing, an axially externally threaded area comprising an insulting material, wherein a bottom part of the pole part comprises the axially externally threaded area.

10. The method according to claim 9, wherein fibre or ceramic elements are implemented into a bulk material at least in a transition area between the bottom part of the pole part and the axially externally threaded area so as to provide mechanical reinforcement of the transition area.

11. The method according to claim 9, wherein at least one conductive electrode or shielding is integrated into a bulk material of the threaded area.

12. The method according to claim 9, wherein at least a pole will be sealed at a side where the pole part is included in a switchgear opening.

* * * * *